United States Patent [19]

DeAngelis

[11] 4,162,419
[45] Jul. 24, 1979

[54] ALTERNATOR HAVING IMPROVED RECTIFIER COOLING

[75] Inventor: Larry E. DeAngelis, Northville, Mich.

[73] Assignee: Ford Motor Company, Dearborn, Mich.

[21] Appl. No.: 856,696

[22] Filed: Dec. 2, 1977

[51] Int. Cl.² .............................................. H02K 1/22
[52] U.S. Cl. ...................................... 310/266; 310/62; 310/68 D
[58] Field of Search .............. 310/52, 68, 68 D, 75 R, 310/62, 63, 263, 266, 158, 159

[56] References Cited

U.S. PATENT DOCUMENTS

| 3,041,484 | 6/1962 | Freer | 310/68 R |
|---|---|---|---|
| 3,134,039 | 5/1964 | Bosch | 310/263 |
| 3,217,197 | 11/1965 | Sturzenegger | 310/263 |
| 3,253,167 | 5/1966 | Bates | 310/68 R |
| 3,539,850 | 11/1970 | Sato | 310/68 R |
| 3,548,226 | 12/1970 | Sato | 310/263 |
| 3,586,892 | 6/1971 | Sato | 310/68 R |
| 3,731,126 | 5/1973 | Hagenlocher | 310/68 R |
| 3,748,509 | 7/1973 | Karcher | 310/62 |
| 3,863,127 | 1/1975 | Raver | 310/68 D |
| 4,087,713 | 5/1978 | Binder | 310/266 |

Primary Examiner—R. Skudy
Attorney, Agent, or Firm—Robert W. Brown; Clifford L. Sadler

[57] ABSTRACT

The rectifier assembly of an alternator is provided with improved cooling by improved air flow directed over the semiconductor elements of the rectifier assembly. Improved flow of air is provided by an auxiliary fan blade that is attached to a rotating member in the alternator structure. The fan blade is in proximity to the semiconductor rectifier elements of the rectifier assembly. Air ports are provided in the alternator housing to accommodate this air flow and to improve the distribution of cooling air.

6 Claims, 5 Drawing Figures

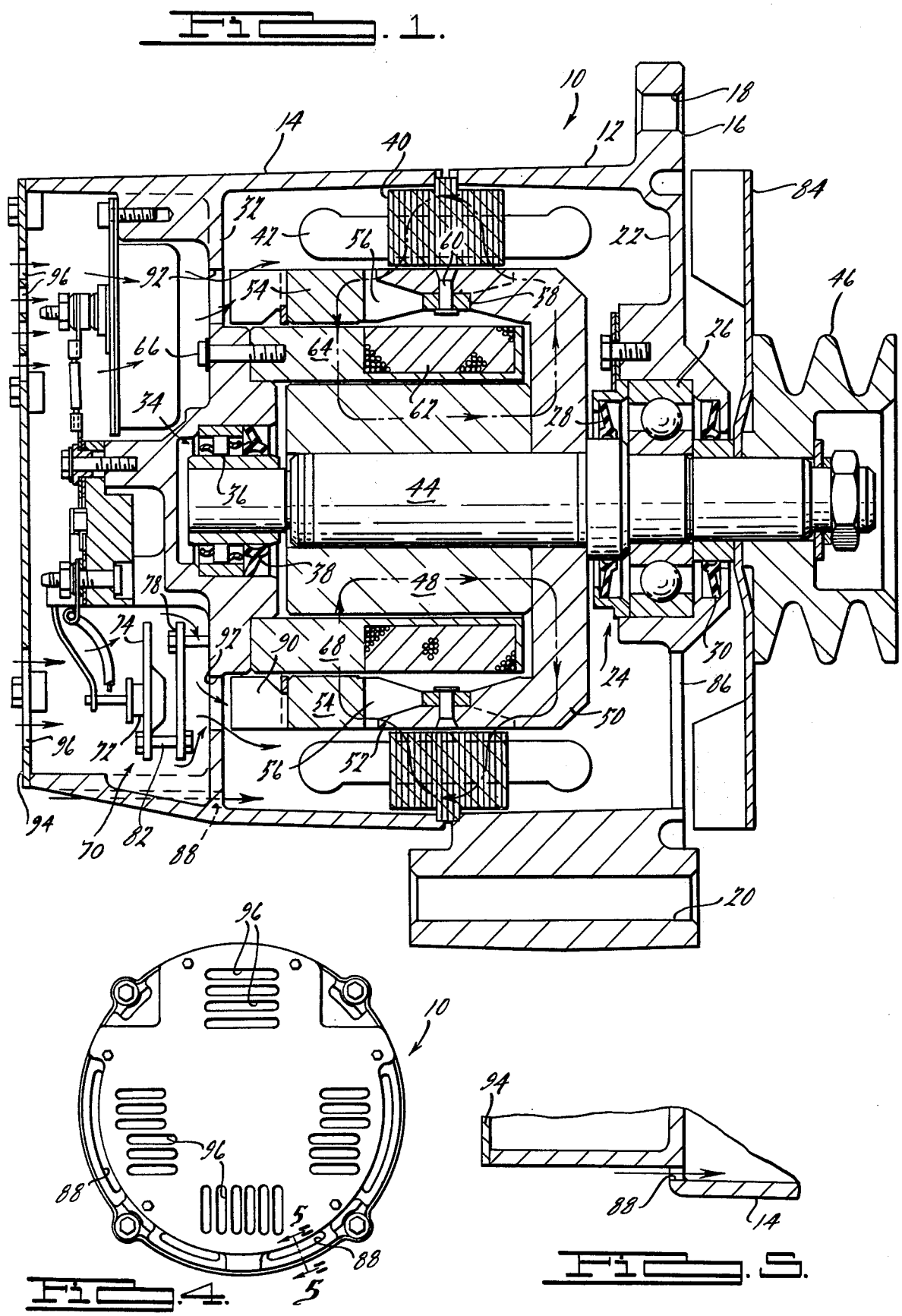

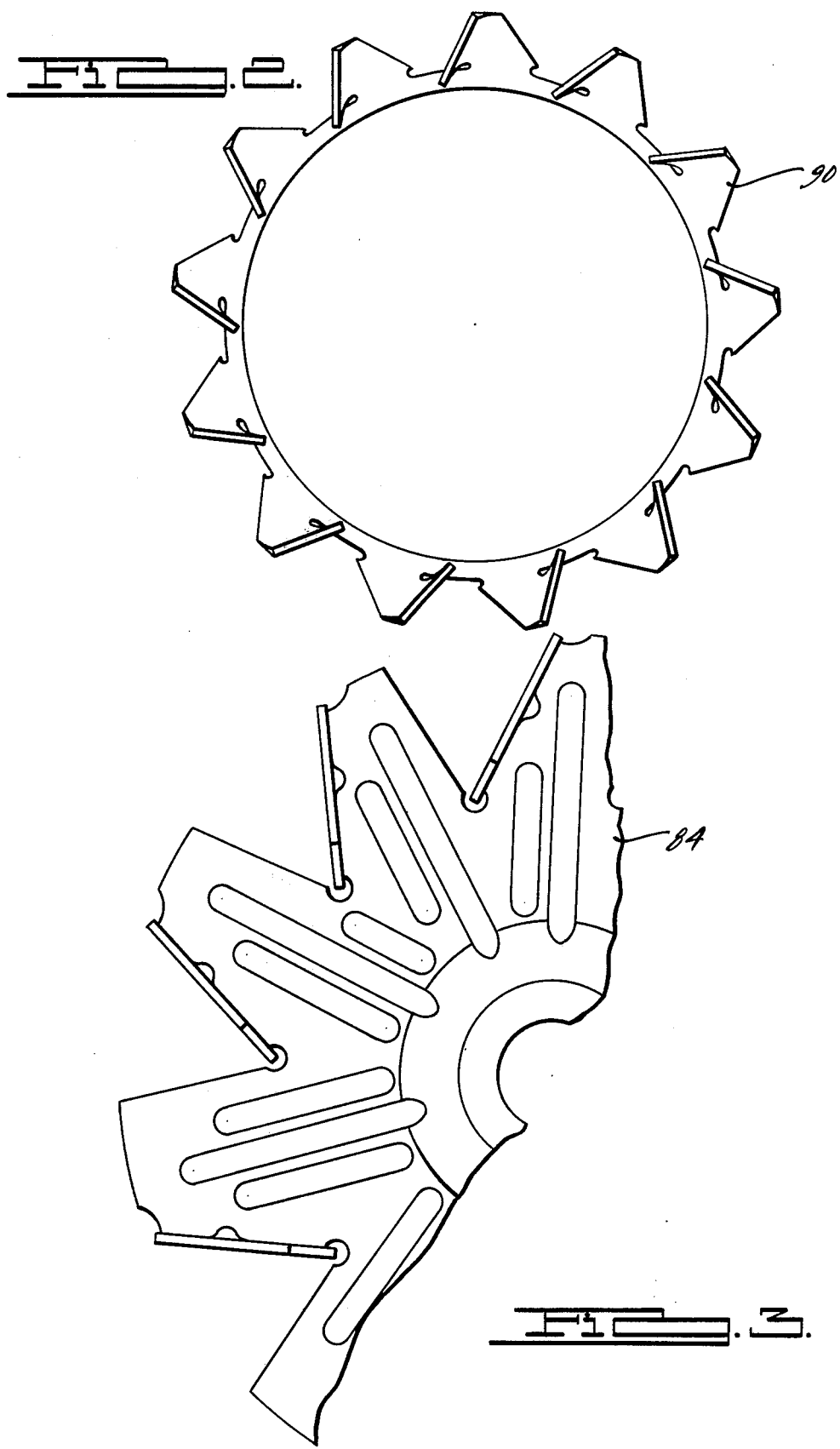

ALTERNATOR HAVING IMPROVED RECTIFIER COOLING

BACKGROUND OF THE INVENTION

The present invention is directed to the field of alternator structures in general and more particularly to that portion of the above-noted field which is concerned with the placement of rectifier assemblies within an alternator housing to provide a compact machine for generating a DC output from a rectified AC signal produced by rotary motion. More particularly, the present invention is directed to that portion of the above-noted field which is concerned with the provision of adequate cooling for the rectifier assemblies of such alternators to avoid heat induced failure of the semiconductor rectifier elements. The invention is particularly directed to an alternator structure suitable for use in a motor vehicle electrical system.

DESCRIPTION OF THE PRIOR ART

It is well known that a DC supply voltage may be generated by utilizing an alternator to generate an AC voltage and by rectifying this voltage to provide the desired DC output. Such alternators in motor vehicle applications typically include a rotary shaft driven by the vehicle's engine. Means associated with the shaft are provided to produce time variation of a magnetic field coupled to stator coils in the alternator. The resulting AC output from the stator coils is applied to a full-wave rectifier to convert the AC voltage to a rectified DC voltage. The most common constructional arrangement is to situate the rectifier member physically within the alternator housing at the end thereof opposite from the source of rotary energy input.

It has recently become the practice to include a substantial number of electrically operated or actuated items of accessory equipment on the vehicle. For example, vehicles may now come equipped with power seats, power windows, power radio antennas, heated window defroster elements, multiple radio equipment and other power operated accessories. As the number of electrically operated accessories utilized on a vehicle increases, the current demand from the alternator structure increases. As the current output from an alternator structure increases, the diodes of the rectifier assembly are called upon to pass larger and larger amounts of current. This requires that more expsensive diodes be used and also results in the generation of substantial quantities of heat at the diodes that must be rapidly dissipated to prevent heat-induced failure of the diodes.

The normal placement of the alternator within the engine compartment and the provision of that structure with a voltage rectifier requires that the voltage rectifier be exposed to an environment having substantially higher ambient temperatures than was the case prior to use of catalytic converters and other emission control devices and automotive air conditioning. To protect the semiconductor elements of the voltage rectifier assembly from destructive temperature conditions when the differential temperature between these devices and their environment is reduced requires that substantially greater quantities of air be passed over or around the semiconductor rectifier elements to accomplish the necessary heat transfer. It is therefore a specific object of the present invention to provide in an alternator structure of the type incorporating a rectifier assembly a means for improving or increasing the quantity of air flowing over or around the semiconductor rectifier members. Moreover, it is desired to accomplish this object without substantially increasing alternator size and cost and without adding complex structure to the alternator.

The alternator structure as presently in use typically is provided with a fan blade situated on one end of the alternator shaft and powered by that shaft to cause a cooling flow of air to pass over the alternator stator coils. By providing the alternator housing with a large number of air flow apertures situated on the side of the stator coils opposite from the normally provided fan blade this cooling flow of air has been arranged to flow, at least partially, across the rectifier assembly. One solution to the problem set forth hereinabove would be to rearrange the passages so as to provide a greater cross-sectional area in close proximity to the voltage rectifier structure. Alternatively, an increase in the size of the normally provided fan blade could increase the volume of air flow.

These solutions to the problem present serious practical problems. Rearrangement of the apertures in the armature housing would present strength problems in the portion of the housing having the increased area. Furthermore, the volume of air flowing through an alternator structure has a practical limit based on the total area of apertures in proximity to the fan blade and the throttling effect provided by these apertures.

SUMMARY OF THE PRESENT INVENTION

The present invention provides an alternator construction wherein an auxiliary fan is attached to the rotor structure for rotation therewith and is located in proximity to the semiconductor rectifier devices of a rectifier assembly. In the case of a brushless alternator assembly, the auxiliary fan comprises a generally annular fan blade mounted to the outer annular portion of the rotor. In the case of a brush type alternator, the fan blade may be suitably mounted to any convenient portion of the rotor to position the fan blade elements in proximity to the semiconductor rectifier devices. The fan blade elements may be contoured so that, in cooperation with the direction of rotation of the rotor, the direction of air flow may be from or toward the interior of the alternator housing.

BRIEF DESCRIPTION OF THE DRAWING

FIG. 1 illustrates, in a sectional view, a brushless type alternator incorporating the present invention.

FIG. 2 illustrates one form of auxiliary fan means usable in the alternator of FIG. 1.

FIG. 3 is a fragmentary elevational view of the primary fan member used with the alternator of FIG. 1.

FIG. 4 is an end view of the alternator of FIG. 1.

FIG. 5 is a sectional view taken along the line 5—5 in FIG. 4.

DETAILED DESCRIPTION OF THE PREFERRED EMBODIMENT

With reference to the drawings, wherein like members designate like structure throughout the various views, FIG. 1 illustrates a brushless type alternator in a sectional view. Brushless type alternator 10 is provided with a two-part substantially-cylindrical housing which includes a front portion 12 and a rear portion 14. Front portion 12 is provided with means, for attachment of the alternator to an internal combustion engine, in the form of flange 16 which includes a bolt passage 18 and a pivot passage 20. Housing front portion 12 is also provided with means defining an end wall portion 22. End wall portion 22 is provided with a central bearing receiving aperture, and bearing means indicated generally as 24 are provided therein. The bearing means in the illustrated embodiment include a ball bearing structure 26 and grease traps mounted on either axial side thereof denoted as 28, 30.

Housing rear portion 14 is provided with an intermediate wall portion 32 that includes bearing receiving means 34, which are similarly provided with a bearing member 36 and at least one grease trap or seal 38. Housing rear portion 14 is suitably connected to housing front portion 12 by means, such as complementary nut and bolt connections (not shown) extending between the housing portions and arranged to retain a stator member 40. Stator member 40 forms the armature of the alternator and preferably is wound with three coils to provide three-phase alternator EMF generation. The three coils for convenience are here denoted by the numeral 42.

Alternator shaft 44 is rotatably received within bearings 26,36. Driving member 46, in the form of a double belt pulley, is attached to an axial end of shaft 44 to permit it to be rotatably driven. Shaft 44 is provided with a first ferromagnetic member 48, in the form of a cylinder, which is received about the shaft 44. Second, or cup-shaped, ferromagnetic member 50 is received by shaft 44 and is arranged to be in closely abutting relationship with an axial end of first ferromagnetic member 48. The radially outer periphery or lip of cup-shaped ferromagnetic member 50 is provided with a series of pole fingers, which are shown here in section and identified by the numeral 52.

A third ferromagnetic member 54 is provided with pole fingers 56. The pole fingers 52, 56 are interdigitated or interleaved, but are spaced from one another and are interconnected with a nonmagnetic (preferably stainless steel) coupling ring 58 by rivets 60 or any other suitable form of connection. Coupling ring 58, interconnected with member 50, provides support for member 54.

In the view of brushless alternator 10 illustrated in FIG. 1, the pole fingers 56 of the third ferromagnetic member lie behind the pole fingers of the second ferromagnetic member, which are here shown in section. A field coil 62 is received within a stator-field member 64 and is positioned to be generally within the toroidal cavity formed by the first, second and third ferromagnetic members. Stator-field member 64 is fixedly attached by a plurality of bolts 66 to intermediate wall portion 32 of housing rear portion 14. Field coil 62 is arranged to be energized by a DC source (not shown) to generate a magnetic field within the first, second and third ferromagnetic members and the end portion 68 of stator-field member 64. This field extends between adjacent pole fingers 52, 56 and also extends through portions of armature 40 to induce in the stator windings 42 an EMF resulting from time variation of the magnetic field therein.

To rectify the alternating current produced in the stator windings 42 by the rotation of the first, second and third ferromagnetic members and the field carried thereby rectification means 70 are included within housing rear portion 14. The voltage rectification means 70 is located on the side of intermediate wall portion 32 opposite the shaft 44 and comprises a first plurality of semiconductor rectifier devices, or, diodes, 72 received within positive heat-sink plate 74 and a similar plurality of oppositely-poled semiconductor rectifier devices (not shown) received within a negative and similar heat-sink plate 78. Positive heat-sink plate 74 and negative heat-sink plate 78 are arranged to be overlapping with the negative heat-sink plate being mounted directly to the intermediate wall portion 32 of housing rear portion 14. These two parts are normally electrically common in an automotive environment and the positive heat-sink plate 74 is coupled to, and electrically insulated from, the negative heat-sink plate 78 by suitable means such as insulated mounted means 82.

Because generation of the EMF in stator windings 42 induces eddy currents in stator member 40 and because there are resistive heat losses in the windings, a large quantity of heat will be generated within armature 40. To provide for cooling of the armature 40, a rotary fan member 84 is coupled to shaft 44 for rotation therewith. In addition, end wall portion 22 of housing front portion 12 is apertured as at 86 to permit air to be drawn from the interior of the alternator housing. Additionally, the housing rear portion is apertured as at 88 to permit air entering therein to flow directly toward the armature 40. Apertures 88 may best be seen in FIGS. 4 and 5.

The present invention provides for an additional flow of cooling air intended to pass rectifier assembly 70. For this purpose, auxiliary fan blade 90 is attached to the third ferromagnetic member 54 for rotation therewith. Additionally, intermediate wall 32 of rear housing portion 14 is apertured at locations 92 to facilitate flow of cooling air. An end plate 94 covers the back of housing rear portion 14 and shields the rectifier assembly. The end plate has elongated openings 96 through which cooling air is drawn by the fan blade 90. This cooling air, after passing the rectifier assembly, is drawn through apertures 92 and then mixes with the cooling air drawn by main fan blade 84 through apertures 88. The arrows in FIG. 1 illustrate the air flow pattern described above.

What is claimed is:

1. An alternator having improved air cooling, which comprises:
a housing of substantially cylindrical shape, said housing having front and rear portions, said front portion being cup-shaped and having an end wall and said rear portion having an intermediate wall;
a rotor assembly comprising a shaft journalled for rotation about its axis, said shaft being located within said housing between said end wall of said housing front portion and said intermediate wall of said housing rear portion; a first ferromagnetic member attached to said shaft for rotation therewith; a second ferromagnetic member abutting said first member and attached to said shaft for rotation therewith, said second member being substantially cup-shaped, having pole fingers extending in a direction parallel with the axis of said shaft and defining an annular space between said first member and said pole fingers of said second member; a third ferromagnetic member mounted for rotation with said shaft, said third member having pole fingers interleaved with, but spaced from, the pole fingers of said second member; and a fan blade attached to said third member for rotation therewith, said fan blade being positioned between said third member and said intermediate wall of said housing rear portion;

an armature mounted within said housing radially outwardly of said rotor assembly;

a field coil positioned in said annular space between said first member and said pole fingers of said second member, said field coil being adapted to generate a magnetic field in said rotor assembly ferromagnetic members and in said armature; and a rectifier assembly for rectifying alternating voltage generated in said armature, said rectifier assembly being located within said housing rear portion on the side of its intermediate wall opposite the side on which said rotor assembly is located.

2. An alternator according to claim 1 wherein the blades of said fan blade are radially displaced from said axis by a distance approximately equal to the spacing of said rectifier assembly from said axis and wherein said housing rear portion intermediate wall has openings therein located between said blades and said rectifier assembly, said fan blade being able to draw air flow past said rectifier assembly and through said openings.

3. An alternator according to claim 2 wherein said fan blade is attached to said third member of said rotor assembly along a surface of said third member that is perpendicular to said axis.

4. An alternator according to claim 3 wherein said third member of said rotor assembly is supported by said second member thereof, a nonmagnetic ring being attached to the pole fingers of said third and second members to couple said third and second members to one another.

5. An alternator according to claim 4 wherein a ferromagnetic member attached to said intermediate wall of said housing rear portion extends into said annular space between said first member and the pole fingers of said second member, said field coil being wound on said member attached to said intermediate wall.

6. An alternator according to claim 5 which includes a main fan blade coupled to said shaft for rotation therewith and located exterior of said housing and adjacent said end wall of said housing front portion, said housing rear portion having apertures therein permitting air to be drawn directly toward said amature through action of said main fan blade and air drawn by said first-mentioned fan blade, after flowing past said rectifier assembly, mixing with said air flowing directly toward said armature.

* * * * *